United States Patent
Zweigle et al.

(10) Patent No.: US 6,880,800 B2
(45) Date of Patent: Apr. 19, 2005

(54) PRESSURE REGULATOR

(75) Inventors: Peter Zweigle, Ditzingen (DE); Martin Surerus, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 71 days.

(21) Appl. No.: 10/629,224

(22) Filed: Jul. 29, 2003

(65) Prior Publication Data

US 2004/0050417 A1 Mar. 18, 2004

(30) Foreign Application Priority Data

Sep. 12, 2002 (DE) .......................................... 102 42 407

(51) Int. Cl.[7] .............................................. F16K 31/02
(52) U.S. Cl. .............................. 251/129.15; 251/129.1; 137/82; 137/625.25
(58) Field of Search ......................... 251/48, 50, 129.1, 251/129.15; 137/82, 625.25, 325, 625.2

(56) References Cited

U.S. PATENT DOCUMENTS 6,796,322 B1 * 9/2004 Sen .............................. 137/82

* cited by examiner

*Primary Examiner*—Timothy L. Maust
(74) *Attorney, Agent, or Firm*—Michael J. Striker

(57) ABSTRACT

A pressure regulator has a magnet component group provided with a metal housing in which a winding and an armature are arranged, a flange composed of a synthetic plastic material and connected in an axial direction to the magnet component group, a metal guiding sleeve which is arranged in the flange for orientation and mounting of the magnet component group, a valve closing member which is actuated by the magnet component group and cooperates with a valve seat to separate a return side from a front side; a metal bushing which is connected with the housing through a metal connection and on which the valve seat is formed, the metal bushing having at least one discharge opening which leads to the return side.

6 Claims, 3 Drawing Sheets

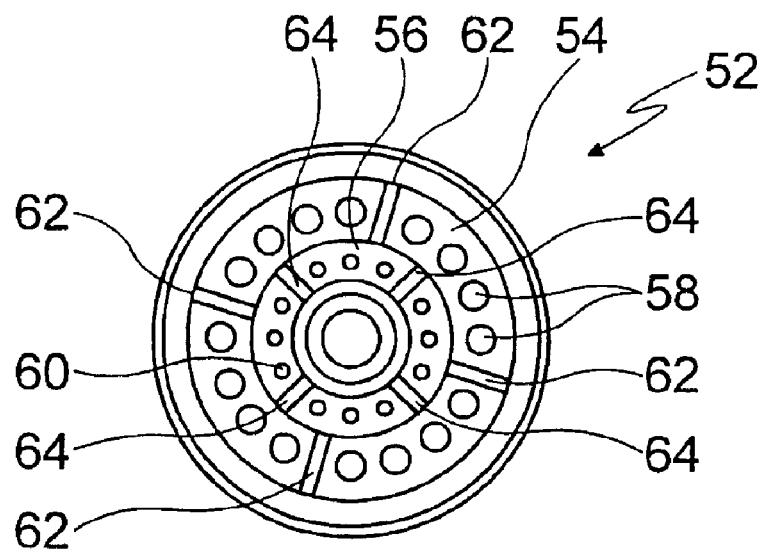
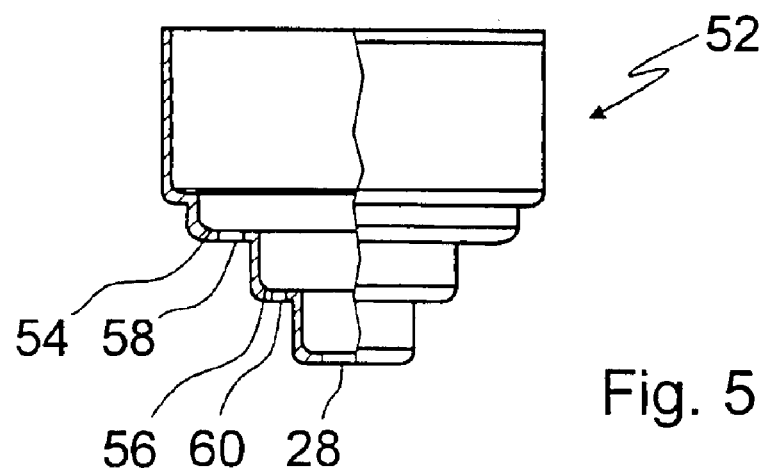

PRESSURE REGULATOR

BACKGROUND OF THE INVENTION

The present invention relates to a pressure regulator, in particular to a pressure regulator for an automatic transmission.

Pressure regulators of this type are known from practice and used for example in an automatic transmission of a motor vehicle for actuation of a switching element, such as a coupling. The pressure regulator therefore is connected on the one hand with a hydraulic cylinder-piston unit which serves as an actuator for the coupling, and is connected on the other hand with the coupling representing the consumer.

Such a pressure regulator includes a magnet component which forms the actuator and has a metallic housing with a flange composed of synthetic plastic material and arranged on the metallic housing. The flange forms an injection molded synthetic plastic part, to which the supplier and the consumer are connected it. A guiding sleeve is injection molded in the flange as an insert for connection with the metallic housing of the magnet component group. The guiding sleeve serves for orientation of the magnetic components group.

The magnet components group actuates a valve closing member through a plunger. The valve closing member cooperates with a valve seat and controls the fluid flow from a pressure side to a return side. When the pressure regulator is operated with a small load, the valve seat can be composed of synthetic plastic.

It is further known to make the valve seat for the pressure regulators, which operate with high loads, on an insert composed of metal and surrounded by the injection molded synthetic plastic of the flange.

In both embodiments, in particular when the valve seat is composed of plastic and when the valve seat is formed as the insert, there is a problem that the distance between the magnet components group and the valve seat can change during a temperature change by an expansion or contraction of the synthetic plastic.

It is also known from practice to form the guiding sleeve for orientation and mounting of the magnet component group, which as a rule is formed as a deep drawn part, so that on the one hand the valve seat for the valve closing member actuated by the magnet component group is provided, and on the other hand the radially oriented discharge openings are provided. In this solution the valve seat is integrated with the deep drawn part formed on the guiding sleeve. The deep drawn part formed in this way is however connected with high manufacturing expenses due to the high conversion degree and the requirement to bring the radially oriented discharge openings leading to the return side, in the region of the valve seat on a relatively small inner diameter, for discharging a fluid quantity controlled by the valve closing member.

SUMMARY OF THE INVENTION

Accordingly, it is an object of the present invention to provide a pressure regulator of the above mentioned general type, which avoids the disadvantages of the prior art.

In keeping with these objects and with others which will become apparent hereinafter, one feature of the present invention resides, briefly stated, in a pressure regulator, which has a magnet component group provided with a metal housing in which a winding and an armature are arranged; a flange composed of a synthetic plastic material and connected in an axial direction to said magnet component group; a metal guiding sleeve which is arranged in said flange for orientation and mounting of said magnetic component group; a valve closing member which is actuated by said magnetic component group and cooperates with a valve seat to separate a return side from a front side; a metal bush which is connected with said housing through a metal connection and on which said valve seat is formed, said metal bushing having at least one discharge opening which leads to said return side.

In the pressure regulator in accordance with the pressure regulator the valve seat is formed by a metallic connection with a metal bushing which is connected with the housing and has at least one discharge opening leading to the return side.

The thusly formed pressure regulator has the advantage that the metal bushing can be manufactured in a simple way and the distance between the valve seat and the magnet component group formed by a metal component group is guaranteed even in the event of a so-called "working", or in other words an expansion and contraction of the flange formed as an injection molded synthetic plastic part.

In accordance with a preferable embodiment of the pressure regulator of the invention, the metal bushing is bucket-shaped and preferably is pressed in the metallic guiding sleeve. In particular with this embodiment, the position of the valve seat with respect to the magnet component group does not change as a result of a temperature-dependent expansion or contraction of the synthetic plastic material of the flange. An axial relative movement of the synthetic plastic material with respect to the magnet component group or the valve seat is however possible. The synthetic plastic material can expand or contract, without involving the metal bushing formed preferably a deep drawn part.

In accordance with this embodiment also a one-sided oil discharge direction is possible with a non-oriented built-in bucket-shaped metal bush, without causing problems during the injection process for radially oriented discharge openings which are difficult to seal, since the metal bushing is pressed-in after the injection process into the guiding sleeve.

The discharge opening can be punched before or after the deep drawing of the metal bushing, drilled or produced by a laser process. When the discharge opening is produced before the deep drawing of the bucket-shaped metal bushing, then during the deep drawing a conversion of the opening geometry is performed. The geometry of the discharge opening can be basically arbitrary, also can be oval. In some cases gratings available on the inner or outer side of the bucket-shaped metal bushing are non-damaging, since the flange is injection molded without the metal bushing and the discharge openings must not be sealed.

In an alternative embodiment which is simple to manufacture, the metal bushing has at least one planar step, on which the discharge opening is formed so as to be axially oriented. In this case the metal bushing can be formed of one piece with the guiding sleeve as a deep drawn part.

When the metal bushing has a step, the discharge opening and also synthetic plastic anchoring openings associated with the guiding sleeve can be punched without problems with space, after deep drawing of the component. This provides a manufacturing simplification for the discharge opening, when compared with the above described known solution.

The planar faces and corner radii of the component which is produced as an integral component composed of the guiding sleeve and the metal bushing can be reinforced, for example, by four corrugations. Thereby the axial rigidity of the component can be optimized and the expansion influence of the injection molding of the synthetic plastic are eliminated.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 is a plan view of the metal bushing of the pressure regulator shown in FIG. 3 in accordance with the present invention; and FIG. 5 is semi-section side view of the metal bushing provided with the step in accordance with FIG. 4.

DESCRIPTION OF THE PREFERRED EMBODIMENTS

Figure 1:
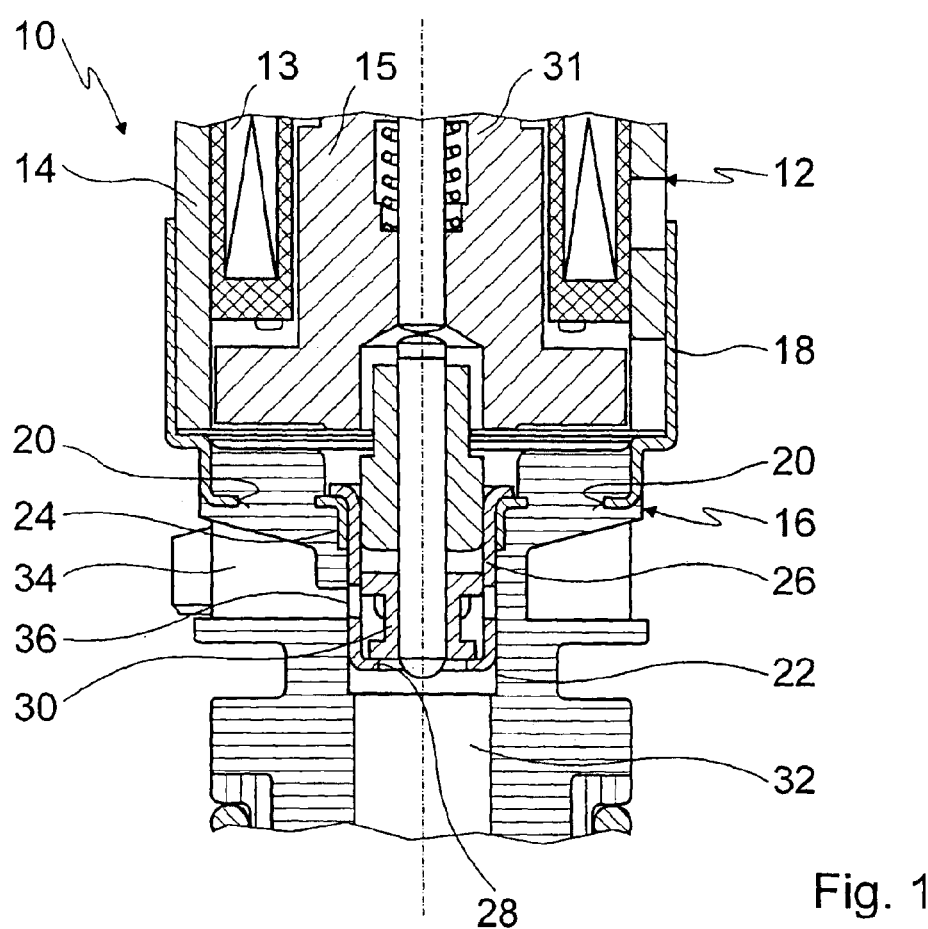
FIG. 1 is a view showing a first embodiment of a pressure regulator in accordance with the present invention with a bucket-shaped metal bushing.

A pressure regulator in accordance with the present invention is shown in FIG. 1 and identified with reference numeral 10. It is designed to be used for an automatic transmission of a motor vehicle. For this purpose it has a magnet component group 12 which forms an actuator. It is provided with a metal housing 14, in which a winding 13 as well as an armature 15 actuatable by the winding 13 are arranged.

A flange 16 formed as an injection molded synthetic plastic part is connected in an axial direction to the magnet component group 12. It is connected with the magnet component group 12 via a metallic guiding sleeve 18 which surrounds the housing 14. The guiding sleeve 18 is formed as a deep drawn part and has synthetic plastic anchoring openings 20 for anchoring in the flange 16.

The guiding sleeve 18 furthermore has a cylindrical region 24 which is arranged in the region of an elongated passage 22 of the injection molded synthetic plastic part 16. A bucket-shaped metal bushing 26 is pressed in the cylindrical region 24.

Figure 2:
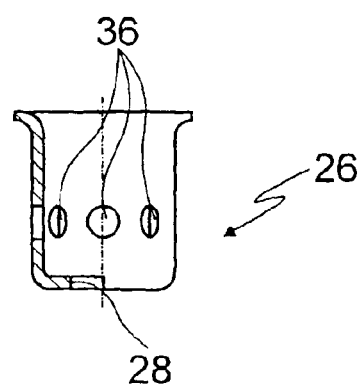
FIG. 2 is a view showing a semi-section through the bucket shaped metal bushing of the pressure regulator of FIG. 1.

The bucket-shaped metal bushing 26 is shown generally in FIG. 2. It is also formed as a deep drawn part and has a valve seat 28 cooperating with a valve closing member 30. The valve closing member 30 is actuated by a plunger of the magnet component group 12, which is inoperative connection with the armature 15. It separates a pressure side 32 connected for example with a not shown hydraulic cylinder, and a return side 34. Discharge openings which are radially distributed over the periphery of the bucket-shaped metal bushing 26 open at the return side 34. Therefore, a fluid flow and thereby a fluid control from the pressure side to the return side is possible.

Figure 3:
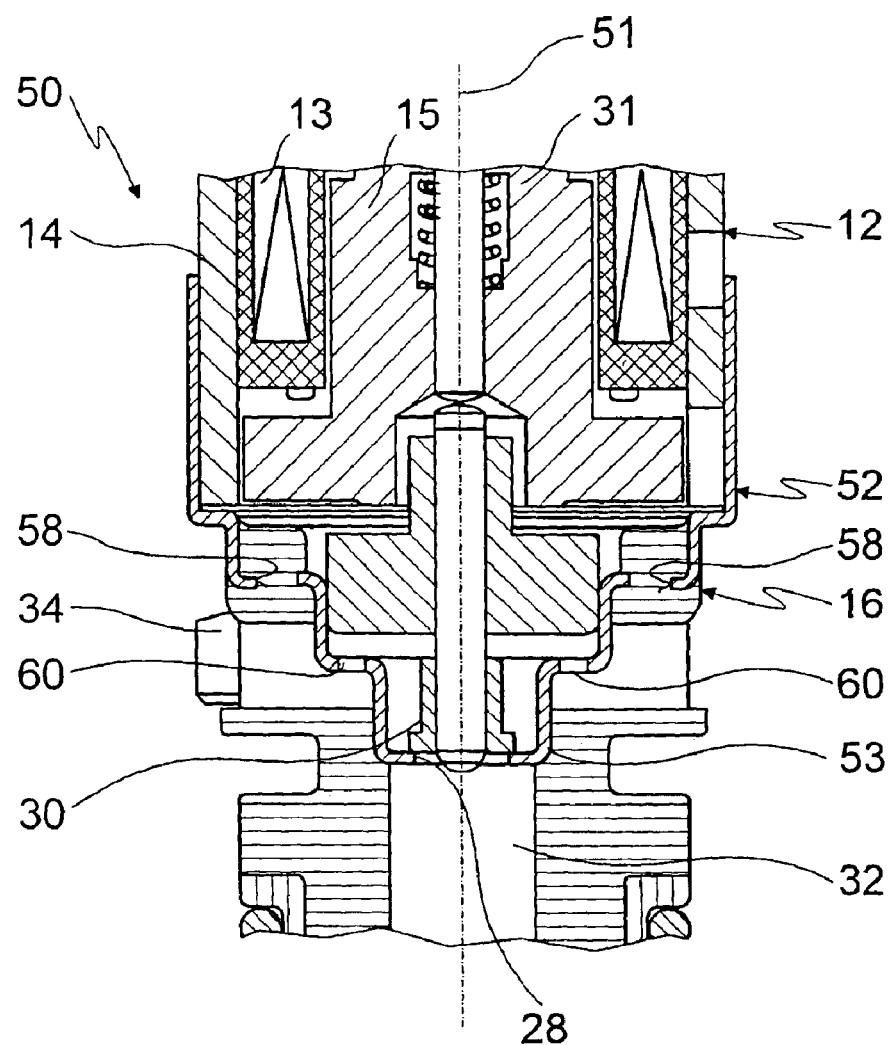
FIG. 3 is a view showing a second embodiment of a pressure regulator in accordance with the present invention, with a metal bushing provided with a step.

FIG. 3 shows the second embodiment of the pressure regulator 50 in accordance with the present invention. Its construction substantially corresponds to the construction of the pressure regulator of FIG. 1.

The pressure regulator 50 however differs from the pressure regulator of FIG. 1 in a guiding sleeve 52 provided for mounting and orientation of the synthetic plastic flange 16 relative to the magnet component part 12, as shown in FIGS. 4 and 5. During injection molding of the synthetic plastic flange 16, the remaining sleeve 52 represents an insert and is produced of one piece with a metal bushing 53. The valve seat 28 which cooperates with the valve closing member 30 is formed on it.

The guiding sleeve 52 with the metal bushing 53 has a stepped cross-section with planar steps or surfaces 54 and 56. Sixteen openings 58 are formed for example on the planar step 54. They serve for anchoring of the guiding sleeve 52 in the injection molded synthetic plastic 16. Twelve discharge openings 60 are formed on the planar step 56 associated with the metal bushing 53. They are oriented with their axes parallel to a longitudinal axis 51 of the pressure regulator 50. The openings 58 and 60 are assembled in four groups each having four or three openings. They are separated from one another by corrugations 62 and 64, which are provided for optimization of the axial rigidity of the guiding sleeve 52.

It will be understood that each of the elements described above, or two or more together, may also find a useful application in other types of constructions differing from the types described above.

While the invention has been illustrated and described as embodied in pressure regulator, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A pressure regulator, comprising a magnet component group provided with a metal housing in which a winding and an armature are arranged; a flange composed of a synthetic plastic material and connected in an axial direction to said magnet component group; a metal guiding sleeve which is arranged in said flange for orientation and mounting of said magnetic component group; a valve closing member which is actuated by said magnetic component group and cooperates with a valve seat to separate a return side from a front side; a metal bushing which is connected with said housing through a metal connection and on which said valve seat is formed, said metal bushing having at least one discharge opening which leads to said return side.

2. A pressure regulator as defined in claim 1, wherein said metal bushing is bucket-shaped.

3. A pressure regulator as defined in claim 2, wherein said metal blushing is pressed in said guiding sleeve.

4. A pressure regulator as defined in claim 1, wherein said metal blushing has at least one step provided with discharge openings with there axis parallel to an axis of the pressure regulator.

5. A pressure regulator as defined in claim 4, wherein said metal bushing which has said step formed of one piece with said guiding sleeve.

6. A pressure regulator as defined in claim 4, wherein said step is provided with corrugations.

* * * * *